(12) United States Patent
Sasaki

(10) Patent No.: US 8,615,130 B2
(45) Date of Patent: Dec. 24, 2013

(54) COLOR PROCESSING APPARATUS, COLOR PROCESSING METHOD, AND NON-TRANSITORY COMPUTER READABLE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 284 days.

(21) Appl. No.: 13/242,236

(22) Filed: Sep. 23, 2011

(65) Prior Publication Data

US 2012/0213437 A1 Aug. 23, 2012

(30) Foreign Application Priority Data

Feb. 22, 2011 (JP) ................................ 2011-036152

(51) Int. Cl.
*G06K 9/00* (2006.01)
*G06K 9/34* (2006.01)

(52) U.S. Cl.
USPC ........................................................ 382/167

(58) Field of Classification Search
USPC ......... 382/103, 162, 164, 165, 167, 173, 284; 358/1.9, 505, 515, 518, 537–538; 348/237, 279; 345/690
See application file for complete search history.

(56) References Cited

U.S. PATENT DOCUMENTS

| | | | |
|---|---|---|---|
| 6,100,999 A | 8/2000 | Ikegami | |
| 6,760,465 B2 * | 7/2004 | McVeigh et al. | 382/103 |
| 6,826,302 B2 * | 11/2004 | Okada et al. | 382/167 |
| 6,975,437 B2 * | 12/2005 | Takemoto | 358/518 |
| 7,414,755 B2 * | 8/2008 | Ott-Heizmann et al. | 358/1.9 |
| 8,494,260 B2 * | 7/2013 | Sawada et al. | 382/162 |
| 2009/0028431 A1 * | 1/2009 | Sasaki et al. | 382/167 |
| 2012/0213437 A1 * | 8/2012 | Sasaki | 382/167 |

FOREIGN PATENT DOCUMENTS

| | | |
|---|---|---|
| JP | A-2000-188695 | 7/2000 |
| JP | A-2002-27276 | 1/2002 |
| JP | A-2004-147265 | 5/2004 |
| JP | A-2008-312119 | 12/2008 |

* cited by examiner

*Primary Examiner* — Amir Alavi
(74) *Attorney, Agent, or Firm* — Oliff & Berridge, PLC

(57) ABSTRACT

A color processing apparatus includes plural computation units and a combining unit. The plural computation units have different center color signals set therein. Each of the plural computation units is configured to calculate a weighted value in accordance with a distance between a given color signal and the set center color signal. The combining unit determines a composite output color signal in accordance with the weighted values calculated by the plural computation units.

12 Claims, 13 Drawing Sheets

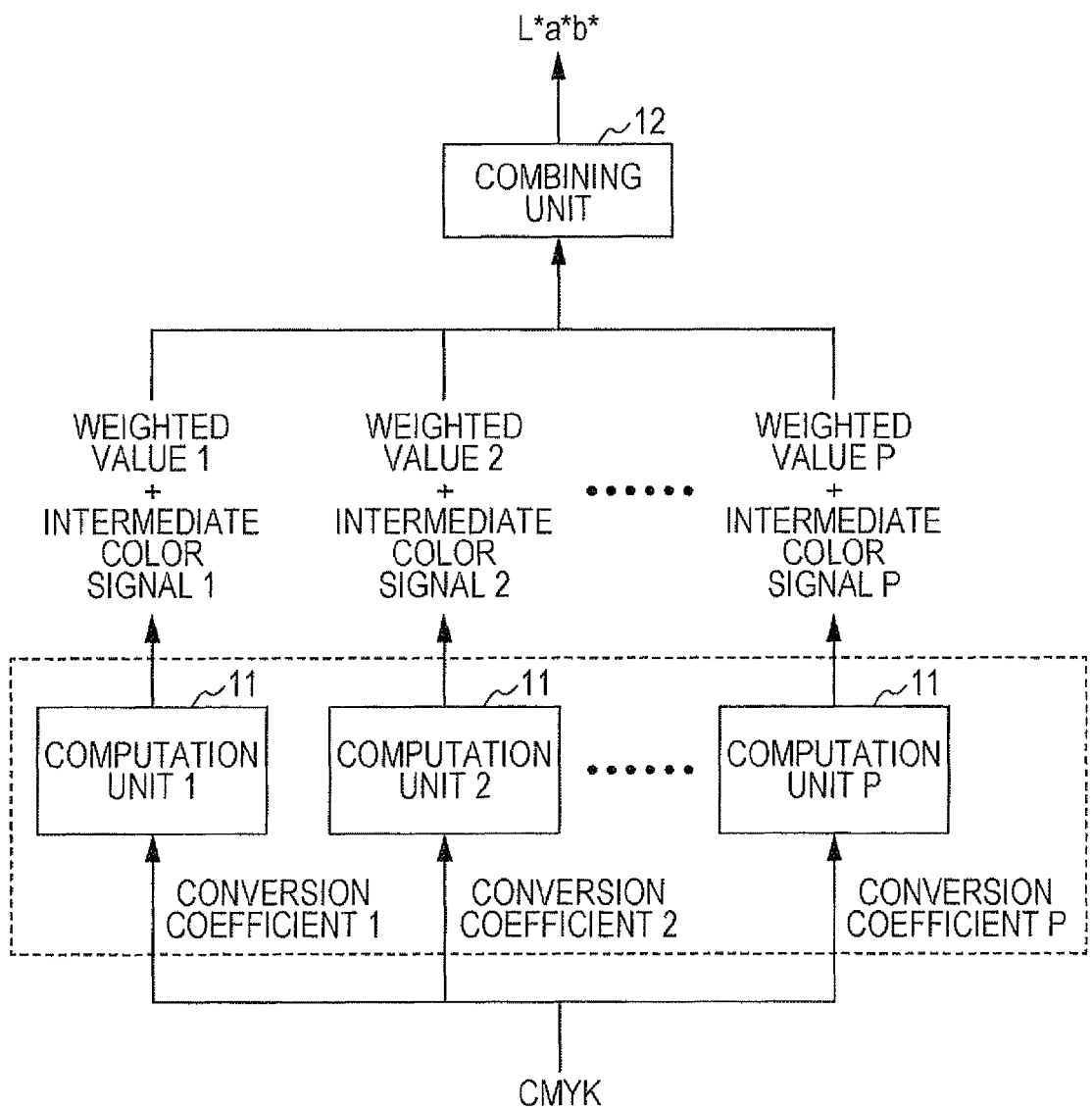

COLOR PROCESSING APPARATUS, COLOR PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-036152 filed Feb. 22, 2011.

BACKGROUND (i) Technical Field

The present invention relates to a color processing apparatus, a color processing method, and a non-transitory computer readable medium.

(ii) Related Art

Input/output characteristics of an output device are approximated as a color conversion model using a pair of color values, namely, a color value given to the output device and a measured color value that is a value obtained by measuring a color output from the output device. Typical color conversion models may be broadly classified into physical models and statistical models. A typical example of the physical models is a Neugebauer halftone dot model. For example, the color values of 16 colors obtained from the combinations of 100% and 0% colorants used in the output device are given to the output device to obtain measured color values. A color conversion model is created from the pairs of 16 color values and measured color values. One example of the statistical models is a neural network. A color value to be given to the output device is given to the neural network, and the corresponding measured color value is given as a supervisory signal for learning, resulting in the input/output characteristics of the output device being approximated. The statistical models require a larger number of pairs of color values given to the output device and measured color values than the physical models, and require a large amount of processing for constructing a color conversion model but achieve high accuracy.

Accordingly, the number of measured color values and accuracy are contradictory to each other. For example, a Neugebauer model in which the color space is divided into subspaces and a Neugebauer model is constructed for each of the subspaces, called a cellular Neugebauer model, has also been developed. This model provides higher accuracy but requires a larger number of measured color values than the model that employs the entire color space.

SUMMARY

According to an aspect of the invention, there is provided a color processing apparatus including plural computation units and a combining unit. The plural computation units have different center color signals set therein. Each of the plural computation units is configured to calculate a weighted value in accordance with a distance between a given color signal and the set center color signal. The combining unit determines a composite output color signal in accordance with the weighted values calculated by the plural computation units.

BRIEF DESCRIPTION OF THE DRAWINGS

Exemplary embodiments of the present invention will be described in detail based on the following figures, wherein:

FIG. 5 is a configuration diagram illustrating a second exemplary embodiment of the present invention;

DETAILED DESCRIPTION

Figure 1:
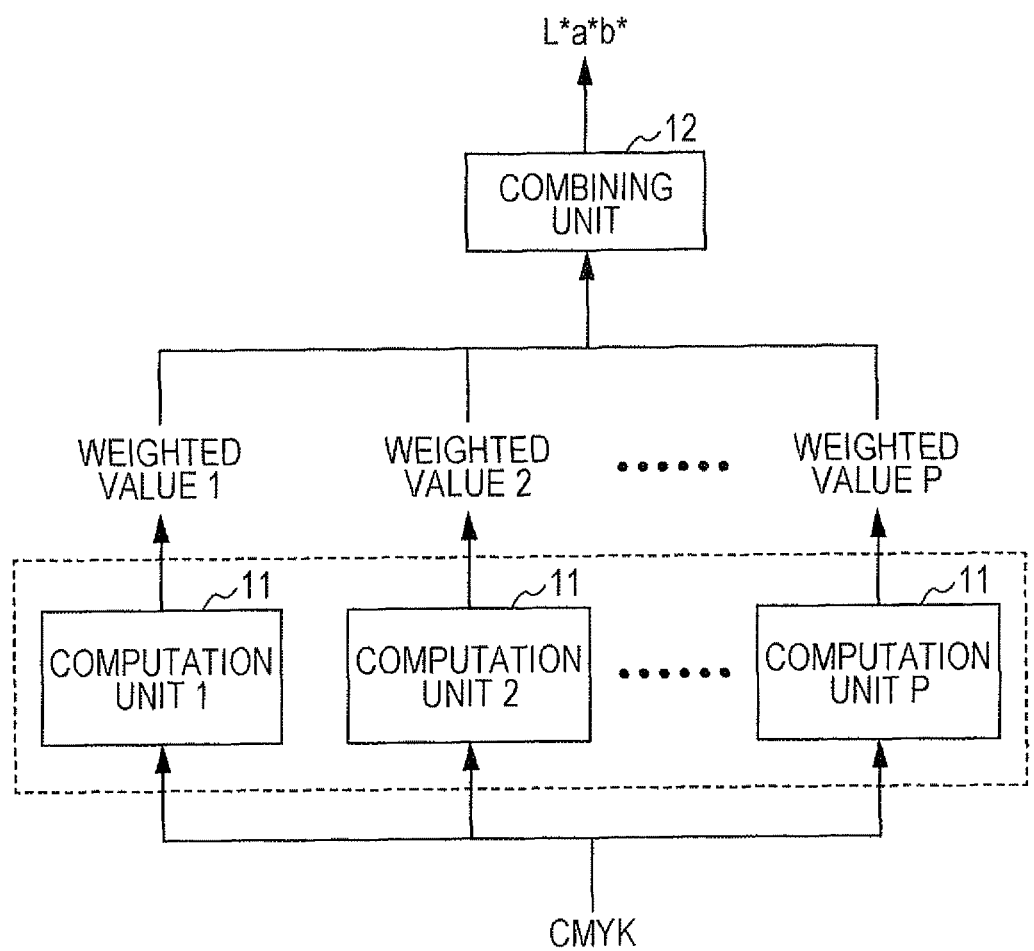
FIG. 1 is a configuration diagram illustrating a first exemplary embodiment of the present invention.

FIG. 1 is a configuration diagram illustrating a first exemplary embodiment of the present invention. In FIG. 1, plural computation units 11 and a combining unit 12 are illustrated. In this example, an source color signal that is a color signal to be processed is based on the CMYK representation, and an output color signal that is a color signal output from the combining unit 12 is based on the $L^*a^*b^*$ representation. It is to be understood that the source color signal and the output color signal are not limited to those in this example, and, for example, the source color signal may be based on any other representation such as CMY, CMYKOG, CMYKRGB, RGB, $L^*a^*b^*$, $L^*u^*v^*$, XYZ, or YCrCb, and the output color signal may be based on any other representation such as $L^*u^*v^*$, XYZ, YCrCb, CMY, CMYK, or RGB.

The plural computation units 11 have set herein different center color signals. Each of the computation units 11 calculates a weighted value in accordance with the distance between the given source color signal and the set center color signal. For example, if the source color signal is based on the CMYK representation, each of the computation units 11 calculates a weighted value for the CMYK representation in accordance with the distance between the source color signal and the set center color signal. It is assumed here that the weighted values are large as they are close to the center color signals. In this case, large weighted values are output when the center color signals set in the computation units 11 are close to the given color signal, and small weighted values are output when the center color signals are away from the given color signal.

Figure 2:
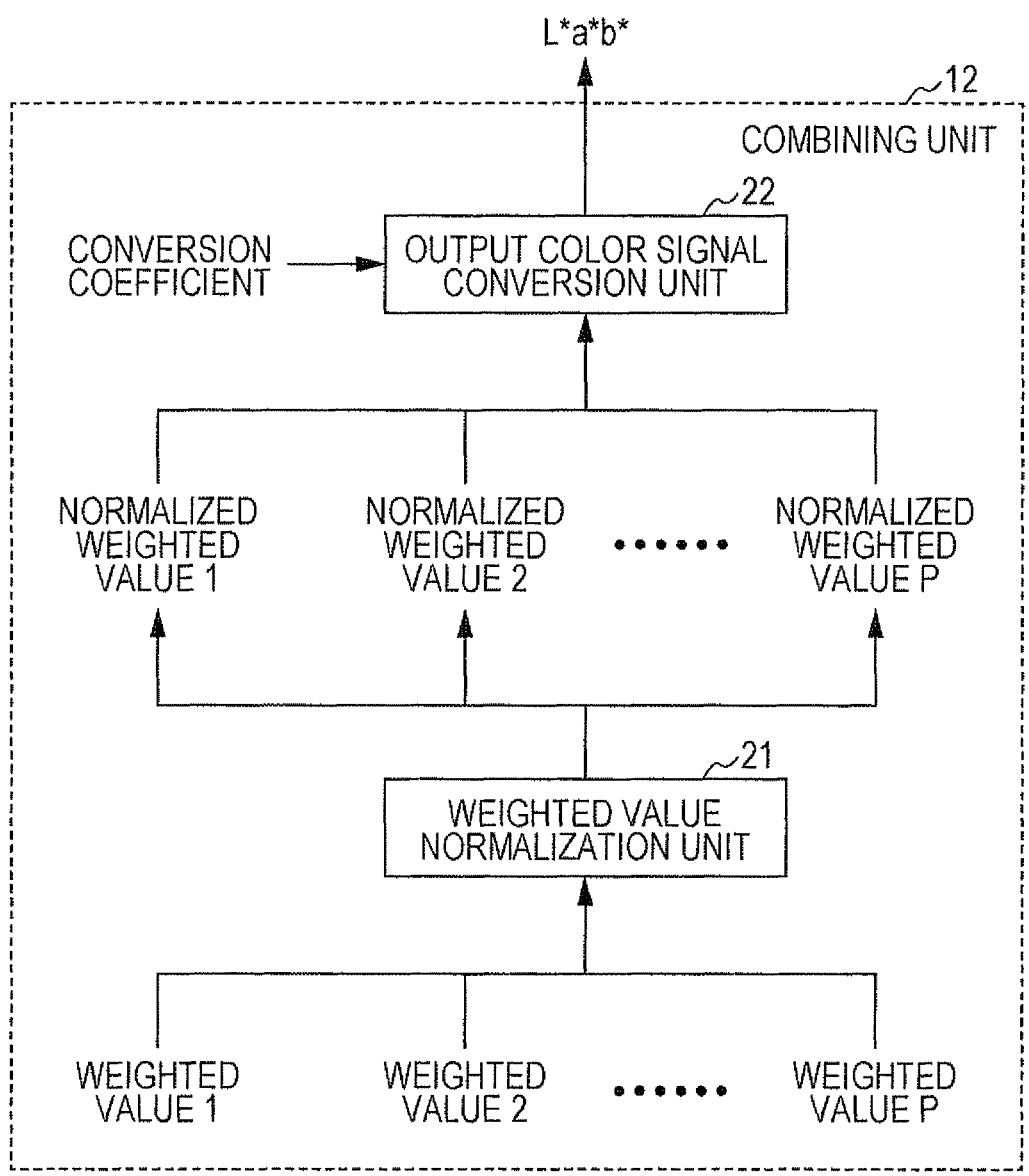
FIG. 2 is a configuration diagram illustrating an example of a combining unit according to the first exemplary embodiment of the present invention.

The combining unit 12 determines a composite output color signal in accordance with a conversion coefficient on the basis of the weighted values calculated by the respective computation units 11. FIG. 2 is a configuration diagram illustrating an example of the combining unit 12 according to the first exemplary embodiment of the present invention. In FIG. 2, the combining unit 12 includes a weighted value normalization unit 21 and an output color signal conversion unit 22. The weighted value normalization unit 21 normalizes the weighted values output from the computation units 11 with the sum. If the source color signal is away from any of the center color signals of the computation units 11, the weighted values are small values. Even in this case, the normalization of the weighted values allows a composite output color signal to be correctly determined, and the extrapolation function is achieved. It is to be noted that the weighted values may be used without being normalized.

The output color signal conversion unit 22 performs linear conversion from the normalized weighted values to an output color signal. A conversion coefficient for use in linear conversion is a matrix having a size given by (the number of normalized weighted values)×(the number of dimensions of an output color signal). Alternatively, the conversion coefficient may be a matrix including a constant term and having a size given by (the number of normalized weighted values 1)×(the number of dimensions of an output color signal).

The conversion coefficient may be given a predetermined value or may be selected from among several values. Alternatively, the conversion coefficient may be statistically acquired by the learning of actual color signals. For example, if the input/output characteristics of the output device are to be determined as a color conversion model, first, plural actual color signal pairs each of which is a pair of a first color signal and a second color signal are obtained with respect to different first color signals by giving each of the first color signals to the output device and measuring an output color to obtain a second color signal. Then, the conversion coefficient may be calculated so that a second color signal corresponding to a first color signal is obtained as an output color signal regardless of which first color signal is given as the source color signal to be processed.

Figure 3:
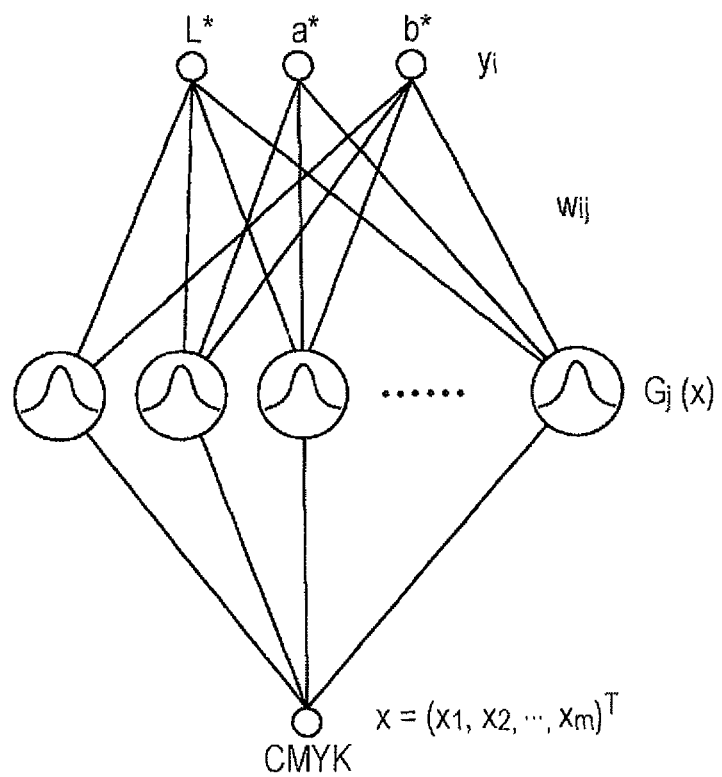
FIG. 3 illustrates an example of a conversion coefficient calculation method used in the combining unit according to the first exemplary embodiment of the present invention.

FIG. 3 illustrates an example of a conversion coefficient calculation method used in the combining unit 12 according to the first exemplary embodiment of the present invention. For example, when a conversion coefficient is to be obtained by learning, a conversion coefficient may be acquired using a radial basis function (RBF) neural network having a structure illustrated in FIG. 3. In the RBF neural network in this example, neurons in the intermediate layer output maximum values when the values of the center color signals set for the Gaussian functions thereof are given, and output small values when the given values are away from the center color signals.

It is assumed that a neuron in the input layer is represented by $x=(x_1, x_2, \ldots, x_m)^T$. Instead of no coupling factors existing between the input layer and the intermediate layer, the j-th neuron in the intermediate layer is fired with a Gaussian function with variance $\sigma_j$ centered on $\mu_j=(\mu_{j1}, \mu_{j2}, \ldots, \mu_{jm})^T$. Therefore, the output $G_j(x)$ of the intermediate layer neuron in response to the given x is given by formula (1).

$$G_j(x) = \exp\left(-\frac{\|x-\mu\|^2}{2\sigma_j^2}\right) \quad (1)$$

If the coupling coefficient between the intermediate layer and the output layer is denoted by $w_{ij}$, the elements $y_i$ (i=1, 2, ..., n) of the output value $y=(y_1, y_2, \ldots, y_n)^T$ of the output layer neuron are given by formula (2).

$$y_i = \sum_j w_{ij} G_j(x) \quad (2)$$

Formula (2) represents a color conversion model indicating the input/output characteristics of the output device based on the REF neural network. It is to be noted that G(x) has been normalized.

Learning is performed using the above RBF neural network and using, for example, the actual color signal pairs described above. Learning may be performed using the steepest descent method, which is used in the back-propagation learning rules. If a supervisory signal is denoted by $\zeta_i$ (second color signal) and a learning constant is denoted by $\eta$, formula (3):

$$\Delta w_{ij} = -\eta \frac{\partial E}{\partial w_{ij}} = -\eta \frac{\partial E}{\partial y_i} \frac{\partial y_i}{\partial w_{ij}} = \eta(\zeta_i - y_i) G_j(x) \quad (3)$$

is obtained, and learning is performed by updating of $w_{ij} \to w_{ij} \Delta w_{ij}$. A color conversion model may be obtained by using sufficiently converged $w_{ij}$.

For example, if the color signal given to the output device is based on the CMYK representation and the measured color signal of the color output from the output device is based on the L*a*b* representation, $x=(C, M, Y, K)^T$ and $y=(L^*, a^*, b^*)^T$ are obtained, and $w_{ij}$ given in formula (2) may be caused to sufficiently converge by using formula (3) for each of the components L*, a*, and b*, and may be determined. The above configuration for determining a conversion coefficient by learning may be added to the configuration illustrated in FIG. 1.

The $w_{ij}$ determined in this manner is used as a conversion coefficient. In the configuration illustrated in FIG. 1, when a color signal is given to the respective computation units 11, each of the computation units 11 computes $G_j(x)$ as a weighted value and outputs the weighted value $G_j(x)$. The weighted values $G_j(x)$ are normalized in the weighted value normalization unit 21 of the combining unit 12. Then, the normalized weighted values $G_j(x)$ are converted in accordance with the conversion coefficient $w_{ij}$, and a composite output color signal is obtained from the respective weighted values.

In existing statistical models, the relationship between a color value given to an output device and a measured color value of a color output from the output device is that of the black box, and mapping is defined to acquire a coefficient of a non-linear calculation formula that connects In and Out to each other. In contrast, physical models are designed to acquire a calculation formula and a coefficient from the principle of overlapping halftone dots, and are therefore advantageous in that challenges in terms of hardware design are reflected, including reflectance from and density on a paper plane. It has been difficult to provide both high accuracy achieved by the statistical models and hardware design achieved by the physical models. Using a technique for statistically acquiring a conversion coefficient with the configuration of a physical model, a configuration may be obtained that is used as a physical model after learning while high accuracy achieved by a statistical model is maintained.

Figure 4A:
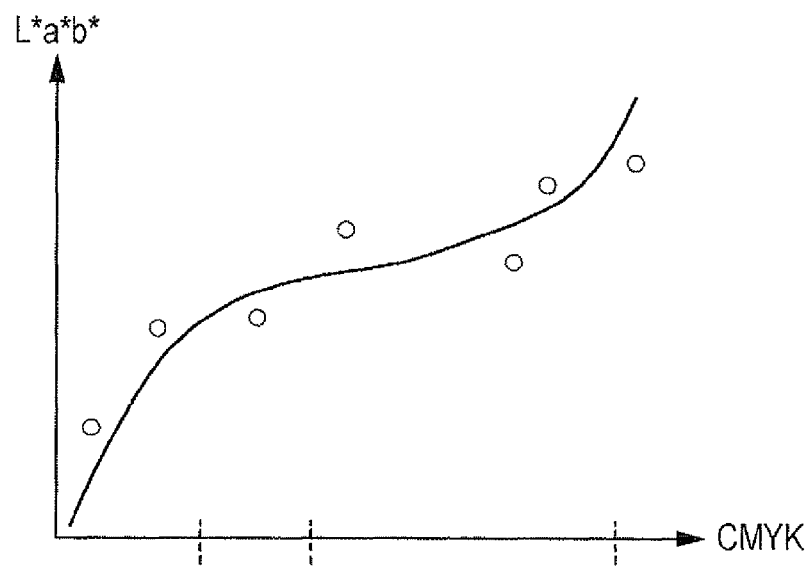
FIGS. 4A and 4B illustrate an overview of the operation according to the first exemplary embodiment of the present invention.
Figure 4B:
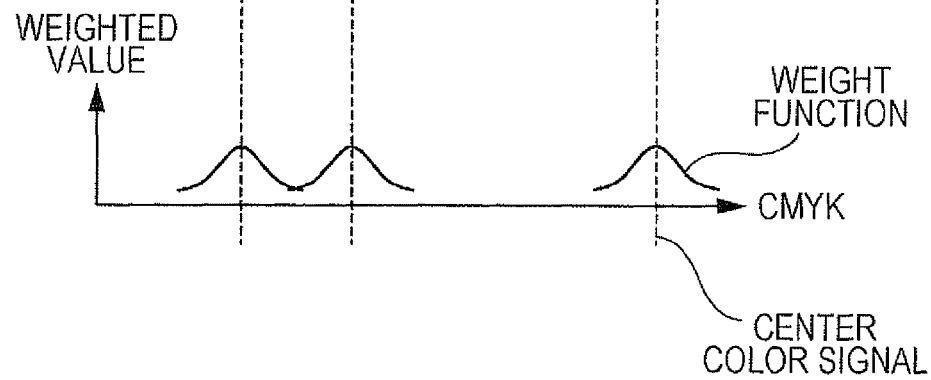

FIGS. 4A and 4B illustrate an overview of the operation according to the first exemplary embodiment of the present invention. FIG. 4A illustrates the relationship between CMYK and L*a*b*, and FIG. 4B illustrates the relationship between CMYK and weighted values. The center color signals sets in the respective computation units 11 differ from one another, and a weight function G for calculating each weighted value is set as a function corresponding to the distance from the corresponding one of the center color signals. Thus, the functions exhibiting peaks illustrated in FIG. 4B are provided in the color areas centered on the respective center color signals. Therefore, the weighted values output from the respective computation units 11 differ depending on the given color signal, and the largest weighted value is output from the computation unit 11 that has the center color signal closest to the given color signal. Further, a supervisory signal (second color signal) with respect to a pattern of the weighted values output from the respective computation units 11 when the first color signal is given is learned by the actual color signal pairs described above, and a conversion coefficient for converting the weighted values is obtained. Using the conversion coefficient, the output color signal (L*a*b*) may be obtained from the weighted values output from the respective computation units 11 in response to the given color signal (CMYK). Therefore, as illustrated in FIG. 4A, the output color signal (L*a*b*) corresponding to the given color signal (CMYK) may be obtained. In FIG. 4A, some of the actual color signal pairs used during learning are indicated by white circles. A color conversion model may be obtained as a function that approximates these actual color signal pairs.

FIG. 5 is a configuration diagram illustrating a second exemplary embodiment of the present invention. Also in this example, a source color signal that is a color signal to be processed is based on the CMYK representation, and an output color signal that is a color signal output from a combining unit 12 is based on the L*a*b* representation. As described in the first exemplary embodiment, the source color signal and the output color signal are not limited to those in this example, and various color signals may be used.

Each of computation units 11 according to the second exemplary embodiment calculates a weighted value, as described in the first exemplary embodiment, and converts a given color signal into an intermediate color signal in accordance with a conversion coefficient. In the example illustrated in FIG. 5, the conversion coefficient is a coefficient of conversion from CMYK to L*a*b* and is thus a (4×3)-dimensional matrix. Alternatively, the conversion coefficient may be a (5×3)-dimensional matrix including a constant term.

Figure 6:
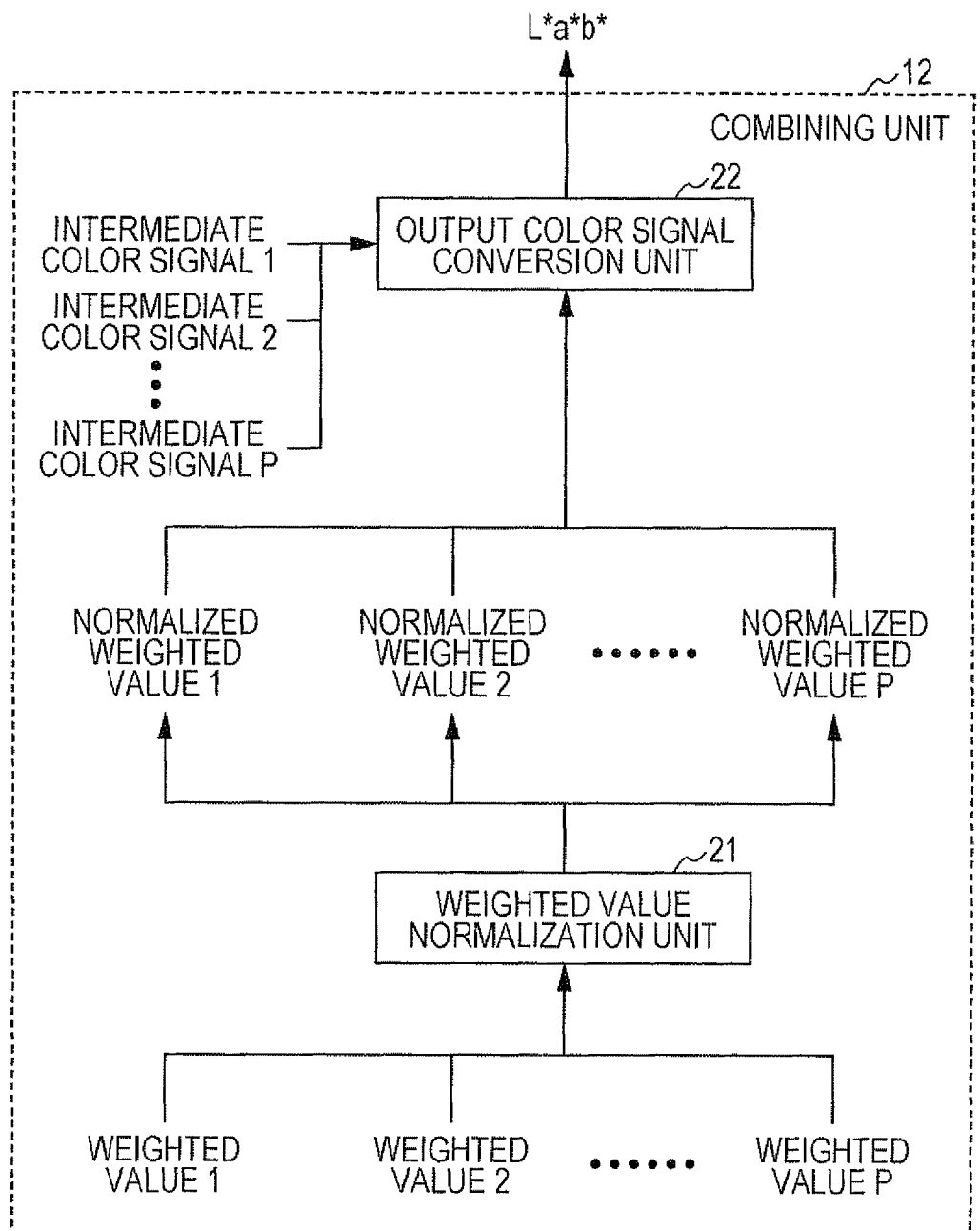
FIG. 6 is a configuration diagram illustrating an example of a combining unit according to the second exemplary embodiment of the present invention.

The combining unit 12 according to the second exemplary embodiment receives a weighted value and an intermediate color signal from each of the computation units 11, and determines a weighted average of the intermediate color signals using the weighted values to obtain a composite output color signal. FIG. 6 is a configuration diagram illustrating an example of the combining unit 12 according to the second exemplary embodiment of the present invention. The combining unit 12 includes a weighted value normalization unit 21 and an output color signal conversion unit 22. The weighted value normalization unit 21 has been described in the first exemplary embodiment and a description thereof is thus omitted here. The output color signal conversion unit 22 multiplies intermediate color signals output from the respective computation units 11 by weighted values output from the computation units 11 and normalized by the weighted value normalization unit 21 to calculate an output color signal. The normalization of the weighted values allows the calculation of a weighted average of the intermediate color signals.

Since the respective computation units 11 perform color conversion based on the conversion coefficient, the accuracy of color conversion in color areas centered on the center color signals may be higher than that in the first exemplary embodiment, and the overall color conversion accuracy may also increase. In addition, the normalization of weighted values allows a composite output color signal to be correctly determined even if the source color signal is away from any of the center color signals of the computation units 11 and weighted values are small values, and the extrapolation function is achieved. It is to be noted that the weighted values may be used without being normalized.

The conversion coefficient used in the computation units 11 may be given a predetermined value or may be selected from among several values. Alternatively, the conversion coefficient may be statistically acquired by the learning of actual color signals. For example, if the input/output characteristics of the output device are to be determined as a color conversion model, first, plural actual color signal pairs each of which is a pair of a first color signal and a second color signal are obtained with respect to different first color signals by giving each of the first color signals to the output device and measuring an output color to obtain a second color signal. Then, the conversion coefficient used in each of the computation units 11 may be calculated so that a second color signal corresponding to a first color signal is obtained as an output color signal regardless of which first color signal is given as the source color signal to be processed.

Figure 7:
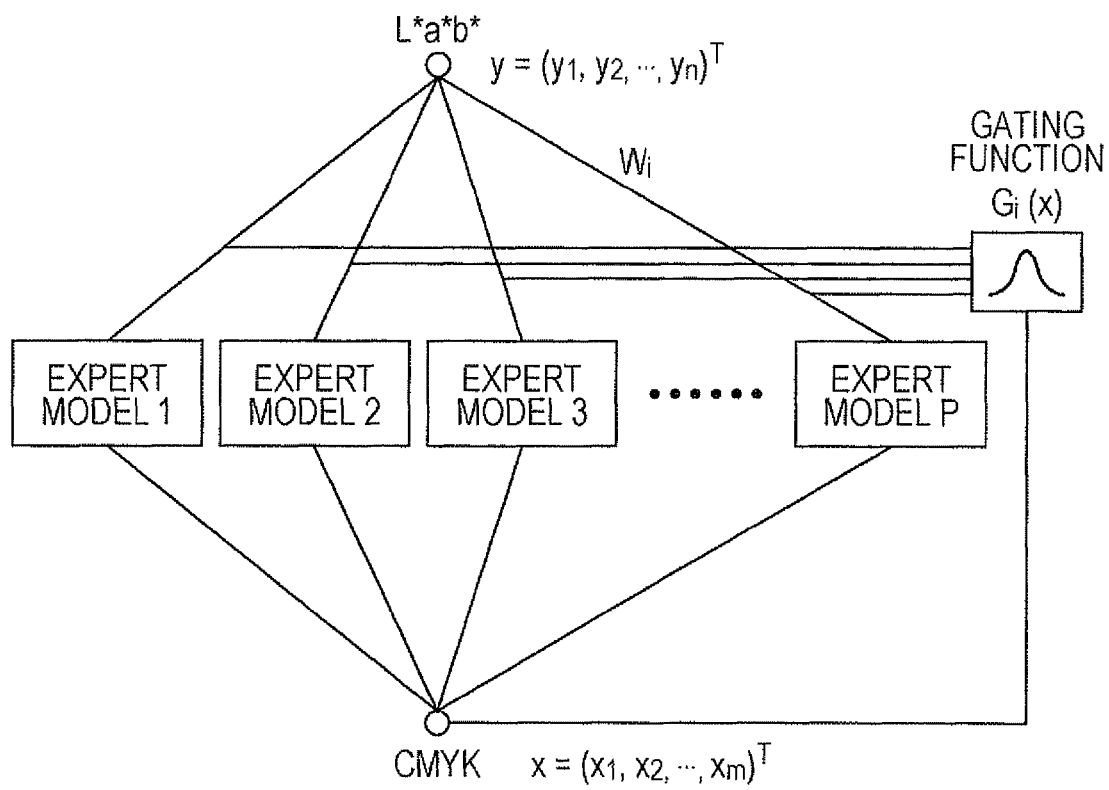
FIG. 7 illustrates an example of a conversion coefficient calculation method used in the combining unit according to the second exemplary embodiment of the present invention.

FIG. 7 illustrates an example of a conversion coefficient calculation method used in the combining unit 12 according to the second exemplary embodiment of the present invention. For example, when a conversion coefficient is to be obtained by learning, a conversion coefficient may be acquired using a normalized Gaussian network having a configuration illustrated in FIG. 7. In the normalized Gaussian network, color conversion based on a conversion coefficient, which is performed by the computation units 11 according to the second exemplary embodiment of the present invention, is referred to as "expert model". It is assumed that a color signal to be given is represented by $x=(x_1, x_2, \ldots, x_m)^T$, the i-th expert model is represented by $f_i(x)$, and the output of the normalized Gaussian network is represented by $y=(y_1, y_2, \ldots, y_n)^T$. Each expert model outputs $y_i=f_i(x)$, and the resulting outputs are weighted by the gating function and are combined to yield a final output y of the normalized Gaussian network.

The gating function of the normalized Gaussian network is implemented using a Gaussian function $N_i(x)$ given in formula (4) below which has been normalized to a value greater than or equal to 0 and less than or equal to 1 with the sum of outputs of the Gaussian functions $G_i(x)$ with respect to all P expert models.

$$N_i(x) = \frac{G_i(x)}{\sum_{j=1}^{P} G_j(x)} \quad (4)$$

In general, a Gaussian function in the normalized Gaussian network is implemented using the multivariate normal distribution. However, if a Gaussian function is used as a color conversion model representing the input/output characteristics of an output device, combinations of colorant colors that are the elements of the given color signal $x=(x_1, x_2, \ldots, x_m)^T$ (for example, $x=(C, M, Y, K)^T$) need not be correlated with one another, and therefore it is not necessary to handle covariance matrices. In this example, if the color signal x is given to the i-th expert model, in consideration of the distribution of $y_i$ that vary with variance $\sigma_i$ with respect to the distance from the average value $\mu_i$, the Gaussian function $G_i$ given in formula (5) may be used.

$$G_i(x) \equiv \exp\left(-\frac{\|x-\mu_i\|^2}{2\sigma_i^2}\right) \quad (5)$$

In the normalized Gaussian network, the expert model $f_i(x)$ is linear conversion, and is expressed using formula (6) below when the conversion matrix of the i-th expert model is denoted by $W_i$.

$$f_i(x)=f_i(x;W_i)=W_i[x^T,1]^T \quad (6)$$

Because of the conversion involving a constant term, $W_i$ is an $\{n\times(m+1)\}$-dimensional matrix. The use of the normalized Gaussian functions and the linear conversion coefficients of the expert models may increase the extrapolation capability and generalization capability.

Using the gating function based on the normalized Gaussian function $N_i$, the output value of the normalized Gaussian network may be calculated using formula (7).

$$y = \sum_i N_i(x)f_i(x;W_i) \quad (7)$$

Formula (7) represents a color conversion model indicating the input/output characteristics of the output device based on the normalized Gaussian network.

Learning is performed using the above normalized Gaussian network and using, for example, the actual color signal pair described above. Learning may be performed using the steepest descent method, which is used in the back-propagation learning rules. If a supervisory signal is denoted by $\zeta=(\zeta_1, \zeta_2, \ldots, \zeta_n)$ (second color signal) and a learning constant is denoted by $\eta$, the conversion coefficient of each expert model may be updated using formula (8).

$$\Delta W_i=\eta(\zeta-y)xN_i(x) \quad (8)$$

A color conversion model may be obtained by using sufficiently converged $W_i$.

For example, if the color signal given to the output device is based on the CMYK representation and the measured color signal of the color output from the output device is based on the L*a*b* representation, $x=(C, M, Y, K)^T$ and $y=(L^*, a^*, b^*)^T$ are obtained, and $W_i$ is caused to sufficiently converge so that a color signal y obtained by giving the first color signal x to each of the computation units 11 and by multiplying the intermediate color signal $f_i(x)$ subjected to color conversion by the $N_i(x)$ obtained by normalizing the gating function $G_i(x)$ becomes a second color signal $\zeta=(L^*, a^*, b^*)^T$ (supervisory signal) corresponding to the first color signal x. The above configuration for determining a conversion coefficient by learning may be added to the configuration illustrated in FIG. 5.

The $W_i$ determined in this manner is used as a conversion coefficient in each of the computation units 11. In the configuration illustrated in FIG. 5, when a color signal x is given to the respective computation units 11, each of the computation units 11 computes the weighted value $G_i(x)$ and the intermediate color signal $f_i(x)$ using the conversion coefficient $W_i$ and outputs the weighted value $G_i(x)$ and the intermediate color signal $f_i(x)$. The weighted values $G_i(x)$ are normalized in the weighted value normalization unit 21 of the combining unit 12, and the normalized weighted values $N_i(x)$ are calculated. Then, the normalized weighted values $N_i(x)$ are multiplied by the intermediate color signals $f_i(x)$, and added together to obtain the composite output color signal y. Since the weighted values are normalized, the weighted average of the intermediate color signals is calculated.

Figure 8A:
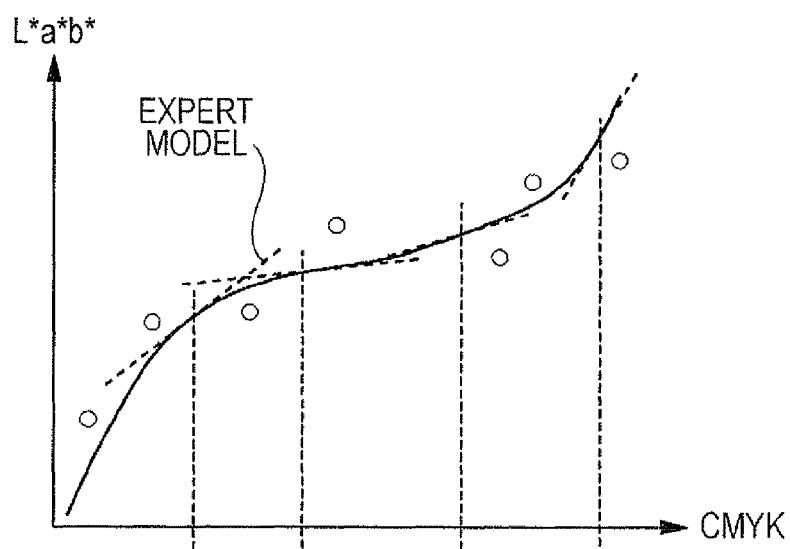
FIGS. 8A and 8B illustrate an overview of the operation according to the second exemplary embodiment of the present invention.
Figure 8B:
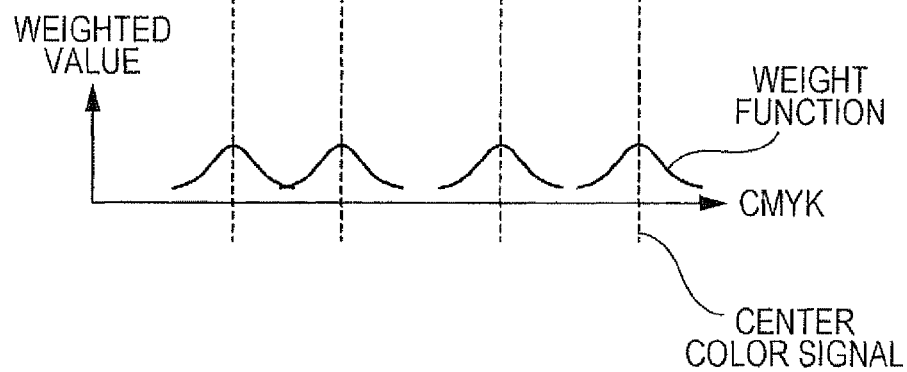

FIGS. 8A and 8B illustrate an overview of the operation according to the second exemplary embodiment of the present invention. FIG. 8A illustrates the relationship between CMYK and L*a*b*, and FIG. 8B illustrates the relationship between CMYK and weighted values. The weighted values illustrated in FIG. 8B have been described with reference to FIG. 4B in the first exemplary embodiment, and a description thereof is thus omitted here. Further, the color conversion using the conversion coefficient in each of the computation units 11 is indicated by a broken line in FIG. 8A. During learning, the functions of color conversion in the respective computation units 11, which are indicated by the broken lines, are corrected gradually, and converge.

While each of the computation units 11 calculates an intermediate color signal from a given color signal using a sufficiently converged conversion coefficient, the intermediate color signals are calculated using the conversion coefficients in the respective computation units 11. Thus, the intermediate color signals are converted in accordance with the functions indicated by the broken lines in FIG. 8A. The weighted average of these intermediate color signals is calculated in accordance with the weighted values calculated in the respective computation units 11, and a composite output color signal is determined. As a result, a conversion function indicated by a solid line in FIG. 8A may be obtained. This function serves as a function obtained by connecting the functions which use the conversion coefficients in the respective computation units 11 with each other using the weighted values. Accordingly, a color conversion model that approximates the input/output characteristics of the output device may be obtained. In FIG. 8A, some of the actual color signal pairs used during learning are indicated by white circles, and it may be found that a color conversion model that approximates the input/output characteristics of the output device has been obtained.

Figure 9:
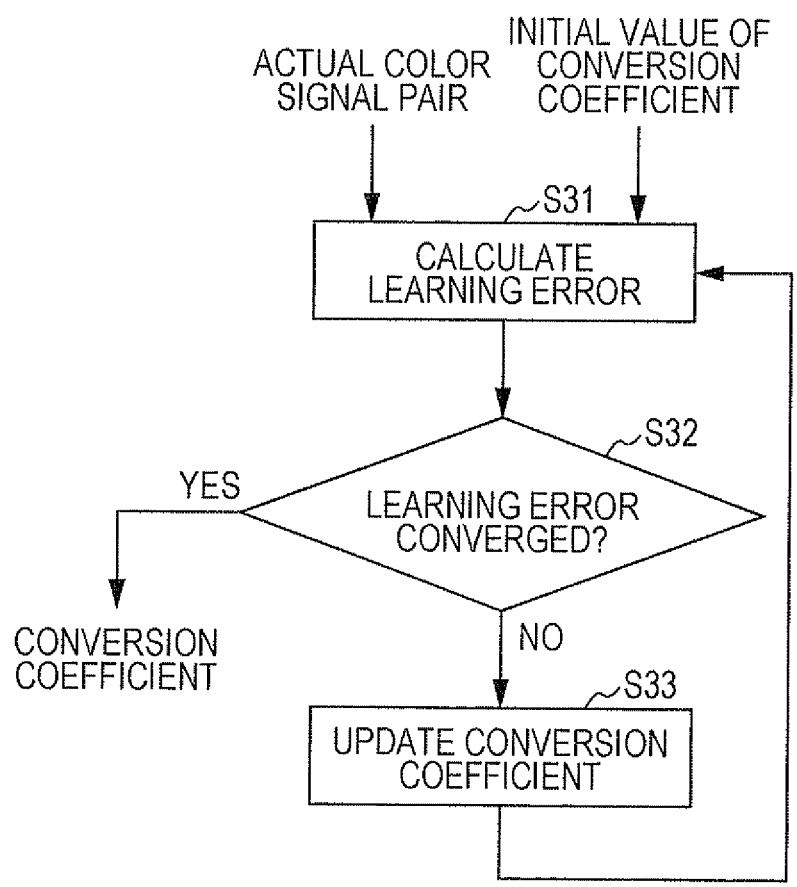
FIG. 9 is a flow diagram illustrating an example of a conversion coefficient learning process.

FIG. 9 is a flow diagram illustrating an example of a conversion coefficient learning process. In the first and second exemplary embodiments described above, the process for learning a conversion coefficient may be performed by using, for example, the procedure illustrated in FIG. 9. An actual color signal pair and an initial value of a conversion coefficient are prepared in advance. Then, in S31, a first color signal in the actual color signal pair is converted in accordance with the initial value of the conversion coefficient to obtain an output color signal, and an error between the output color signal and a second color signal in the actual color signal pair is calculated. The error may be calculated by determining a color difference between the second color signal and the output color signal or by using, for example, an error $\Delta w_{ij}$ or $\Delta W_i$ of the conversion coefficient calculated using formula (3) in the first exemplary embodiment or using formula (8) in the second exemplary embodiment. In S32, it is determined whether or not the error calculated in S31 has converged into a predetermined range. If the error has converged, the current conversion coefficient is used as a learning result. If it is determined that the error has not converged, in S33, the conversion coefficient is updated. The conversion coefficient may be updated using, for example, the steepest descent method or the like, and using $w_{ij}+\Delta w_{ij}$ in the first exemplary embodiment or using $W_i+\Delta W_{ij}$ in the second exemplary embodiment.

After the conversion coefficient is updated, the process returns to S31. Subsequently, an output color signal is calculated from the first color signal in the actual color signal pair using the updated conversion coefficient, and an error between the output color signal and the second color signal is calculated. Then, in S32, it is determined whether or not the error has converged. If the error has not converged, the conversion coefficient is updated. The above process is repeatedly performed. The conversion coefficient obtained when the error has converged may be acquired.

Figure 10:
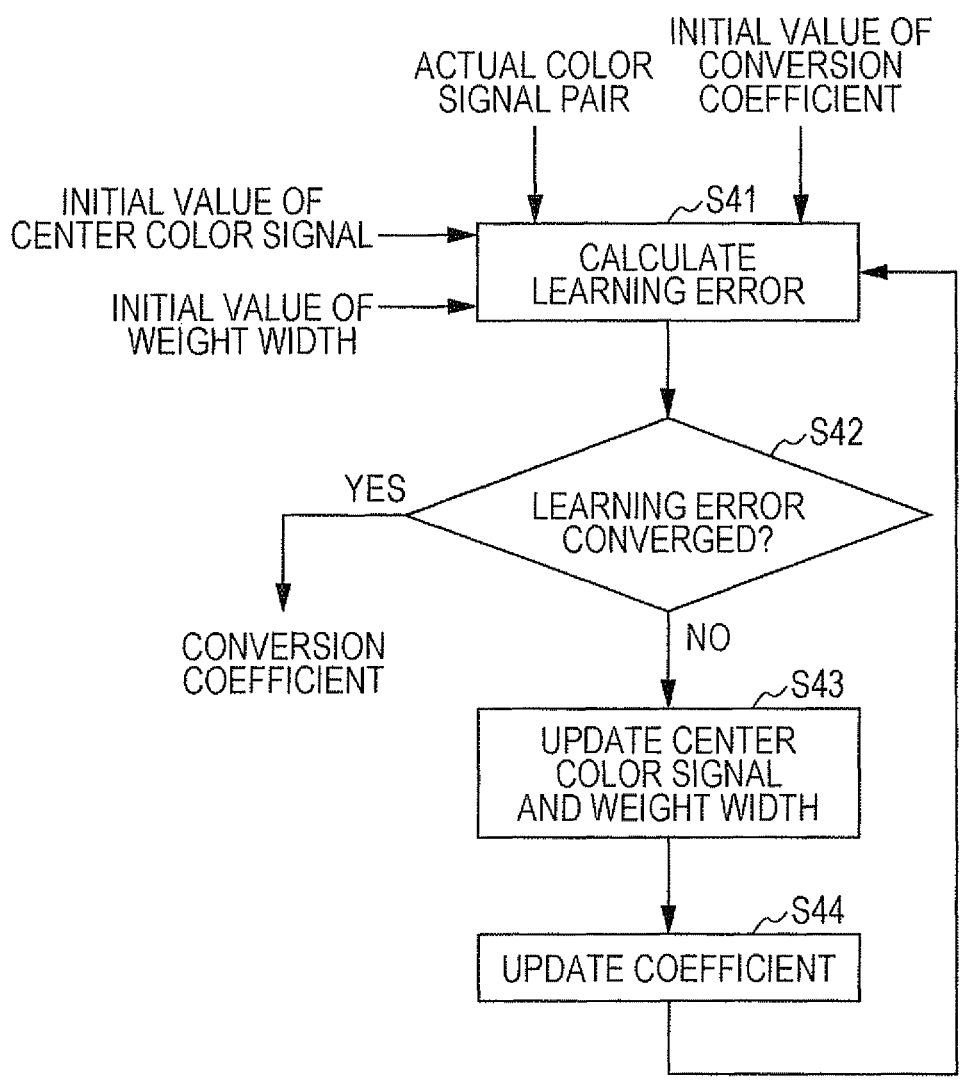
FIG. 10 is a flow diagram illustrating another example of the conversion coefficient learning process.

FIG. 10 is a flow diagram illustrating another example of the conversion coefficient learning process. In the above example, by way of example, a conversion coefficient is determined. However, for example, a center color signal, the shape of a weight function, or the like may also be determined by learning. For example, in a physical model such as a Neugebauer model, a color range defined by, for example, a cellular Neugebauer model or the like is fixed, and the method for calculating the probability of halftone dots has been determined. Therefore, the center color signals described in the first and second exemplary embodiments and the shape of a weight function used to calculate a weighted value are not changed. In the first and second exemplary embodiment described above, however, the center color signals or the shape of a weight function may also be determined by learning.

In this case, an initial value of a center color signal and an initial value of a coefficient representing the shape of a weight function are prepared in advance in addition to an actual color signal pair and an initial value of a conversion coefficient. Examples of the coefficient representing the shape of the weight function may include a coefficient used to control the spread of the weight function. Here, this coefficient is referred to as the weight width, and the weight width is determined. Thus, an initial value of the weight width is prepared.

In S41, a first color signal in the actual color signal pair is converted in accordance with the initial value of the conversion coefficient, the initial value of the center color signal, and the initial value of the weight width to obtain an output color signal. Then, an error between the output color signal and a second color signal in the actual color signal pair is calculated. This error has been described with reference to S31 in FIG. 9.

In S42, it is determined whether or not the error calculated in S41 has converged into a predetermined range. If the error has converged, the current conversion coefficient, center color signal, and weight width are used as learning results. If it is determined that the error has not converged, in S43, the center color signal and the weight width are updated. Also when the center color signal and the weight width are updated, the amounts of update of the center color signal and the weight width may be determined using the steepest descent method so that the error is minimized. Further, in S44, the conversion coefficient is updated using the updated center color signal and weight width. The update of the conversion coefficient has been described above, and the conversion coefficient may be updated by determining the amount of update using the steepest descent method or the like.

After the center color signal, the weight width, and the conversion coefficient are updated, the process returns to S41. Subsequently, an output color signal is calculated from the first color signal in the actual color signal pair using the updated center color signal, weight width, and conversion coefficient, and an error between the output color signal and the second color signal is calculated. Then, in S42, it is determined whether or not the error has converged. If the error has not converged, the center color signal, the weight width, and the conversion coefficient are updated. The above process is repeatedly performed. The center color signal, the weight width, and the conversion coefficient obtained when the error has converged may be acquired.

Figure 11A:
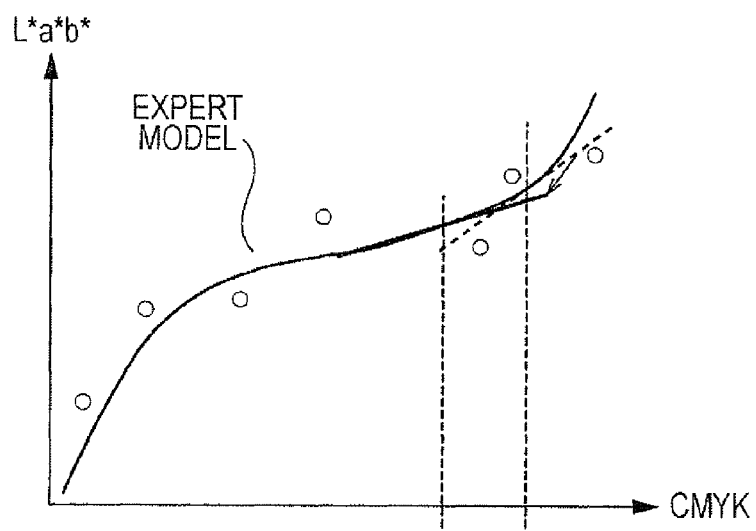
FIGS. 11A and 11B are conceptual diagrams of an example of the operation of acquiring a center color signal, a weight width, and a conversion coefficient.
Figure 11B:
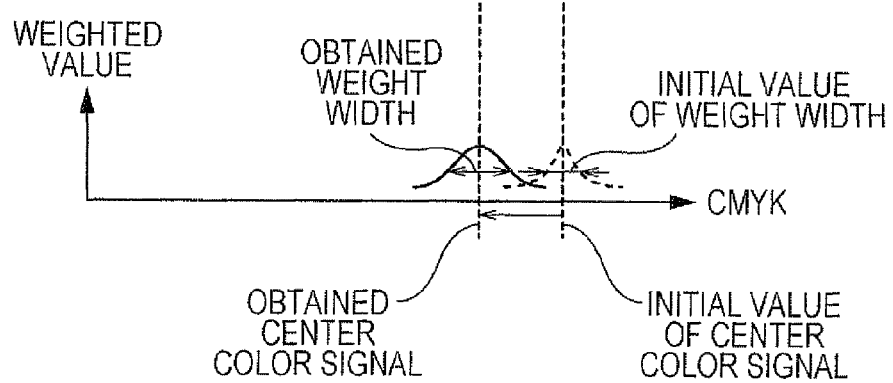

FIGS. 11A and 11B are conceptual diagrams of an example of the operation of acquiring a center color signal, a weight width, and a conversion coefficient. The weight function and center color signal indicated by broken lines in FIG. 11B are initial values, and the weight function and the center color signal obtained by the above process are indicated by solid lines. The center color signal is shifted by the learning process, and the position of a local maximum of the weight function is also shifted in accordance with the movement of the center color signal. In addition, the shape of the weight function changes.

Furthermore, in the relationship between CMYK and $L^*a^*b^*$ illustrated in FIG. 11A, the function indicated by a broken line is based on the initial value of the conversion coefficient, and the function based on the conversion coefficient obtained by the learning process is indicated by a solid line. Therefore, the center color signal, the shape of the weight function, and the conversion coefficient obtained by the learning process are set in accordance with the actual input/output characteristics of the output device.

Figure 12:
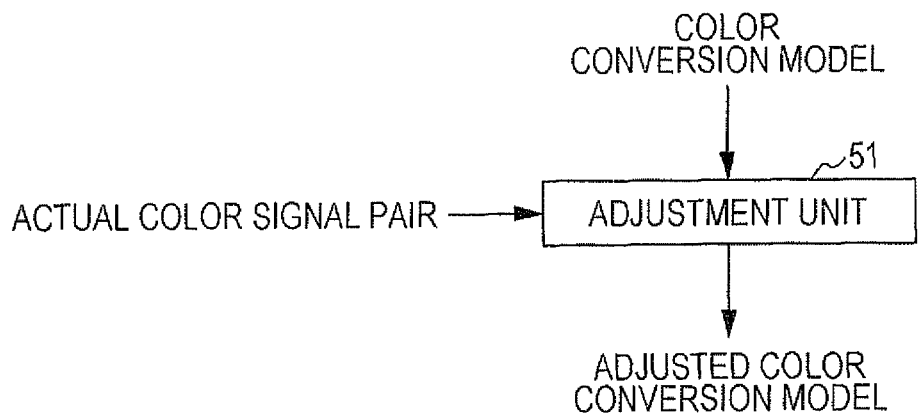
FIG. 12 illustrates an example of an adjustment unit.

FIG. 12 illustrates an example of an adjustment unit. An adjustment unit 51 performs re-learning to update a conversion coefficient when the input/output characteristics of the output device change. The input/output characteristics of the output device may vary in accordance with the use of the output device, and the colors actually output from the output device may be shifted if the output device continues to be used. If a color conversion model representing the input/output characteristics of the output device is created, it is desirable that the color conversion model also be adjusted in accordance with the change in the input/output characteristics of the output device. If a color conversion model is constructed using the configuration illustrated in the first and second exemplary embodiments described above, the color conversion model has physical model characteristics, and therefore may be adjusted by adjusting a center color signal. That is, learning may be performed using the center color signal of each of the computation units 11 serving as the first color signal in the actual color signal pair together with the corresponding second color signal. Learning may be performed in accordance with, for example, the process illustrated in FIG. 9, and in this case, the conversion coefficient that has not been adjusted may be used as the initial value of the conversion coefficient.

The same number of actual color signal pairs as the number of actual color signal pairs used in the learning for constructing a color conversion model may not be necessarily be used to achieve re-learning by the adjustment unit 51, but a smaller number of actual color signal pairs may be used. For example, while learning for constructing a color conversion model may require 1000 or more actual color signal pairs, which may be used to create a color conversion profile, re-learning may only require about 200 or 300 actual color signal pairs to sufficiently achieve re-learning.

Here, by way of example, a conversion coefficient is adjusted; however, a center color signal and the shape of a weight function may also be adjusted in accordance with the process illustrated in FIG. 10. In addition, the adjustment unit 51 may be added to the configuration illustrated in FIG. 1 described in the first exemplary embodiment, or may be added to the configuration illustrated in FIG. 5 described in the second exemplary embodiment.

Figure 13:
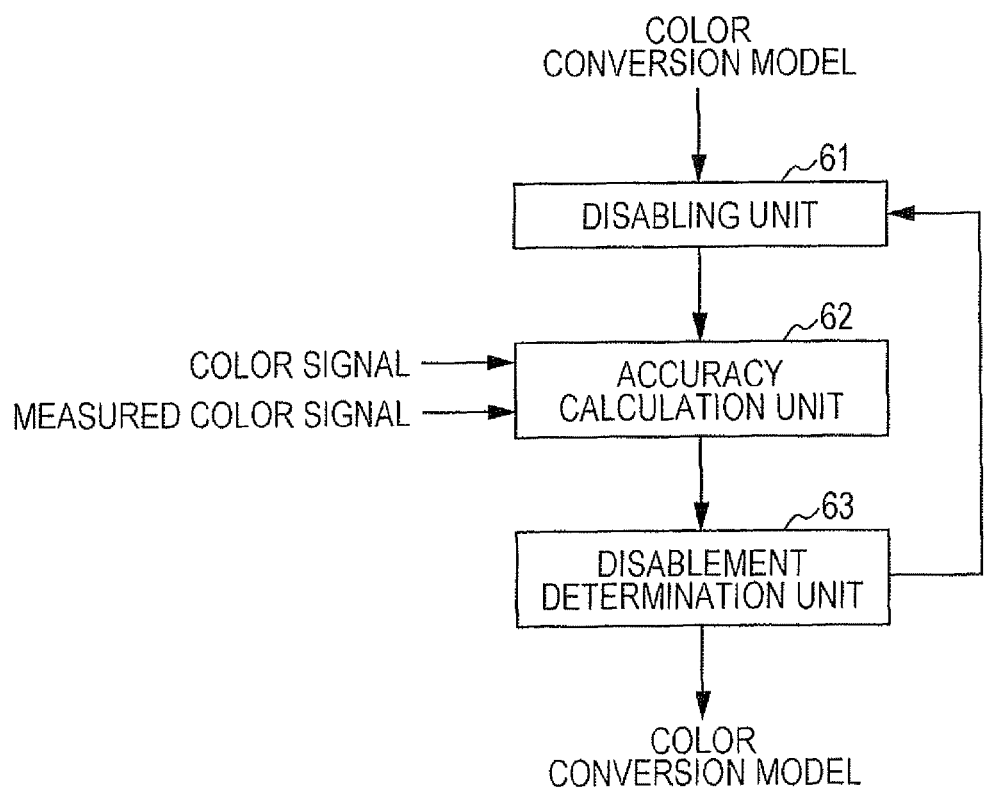
FIG. 13 is a configuration diagram illustrating an example of a process for reducing the number of computation units.

FIG. 13 is a configuration diagram illustrating an example of a process for reducing the number of computation units. In the first and second exemplary embodiments described above, plural computation units 11 are provided. However, all the computation units 11 may not necessarily contribute to the accuracy of color conversion, and such a computation unit 11 that does not contribute to the accuracy of color conversion may be omitted to reduce the number of computation units 11. A configuration for determining which computation unit 11 is to be omitted or whether or not a computation unit 11 is omitted is illustrated in FIG. 13.

A disabling unit 61 disables one of the computation units 11 that are active or operating. For example, the disabling unit 61 may control one of the computation units 11 to stop its operation.

An accuracy calculation unit 62 calculates conversion accuracy from an output color signal obtained by giving a color signal to the configuration in which a computation unit 11 has been disabled by the disabling unit 61 and a measured color signal obtained by giving the color signal to the output device and measuring an output color. The conversion accuracy may be calculated in accordance with, for example, average color difference, maximum color difference, or any other index.

A disablement determination unit 63 determines whether or not the disablement of the computation unit 11 by the disabling unit 61 is acceptable in accordance with the conversion accuracy calculated by the accuracy calculation unit 62. If the conversion accuracy is within a preset range, it may be determined that the disablement of the computation unit 11 by the disabling unit 61 is acceptable. If the conversion accuracy exceeds the preset range, the disablement of the computation unit 11 by the disabling unit 61 is canceled.

The above process is repeatedly performed with changing a computation unit 11 to be disabled by the disabling unit 61, and a computation unit 11 that may be disabled is specified. In addition, a process for specifying a computation unit 11 that may further be disabled from the configuration in which a specified computation unit 11 has been disabled may be repeatedly performed.

The above configuration may be added to the configuration illustrated in FIG. 1 described in the first exemplary embodiment, or may be added to the configuration illustrated in FIG. 5 described in the second exemplary embodiment. Alternatively, an unnecessary computation unit 11 may be disabled in advance with the configuration illustrated in FIG. 13.

Figure 14:
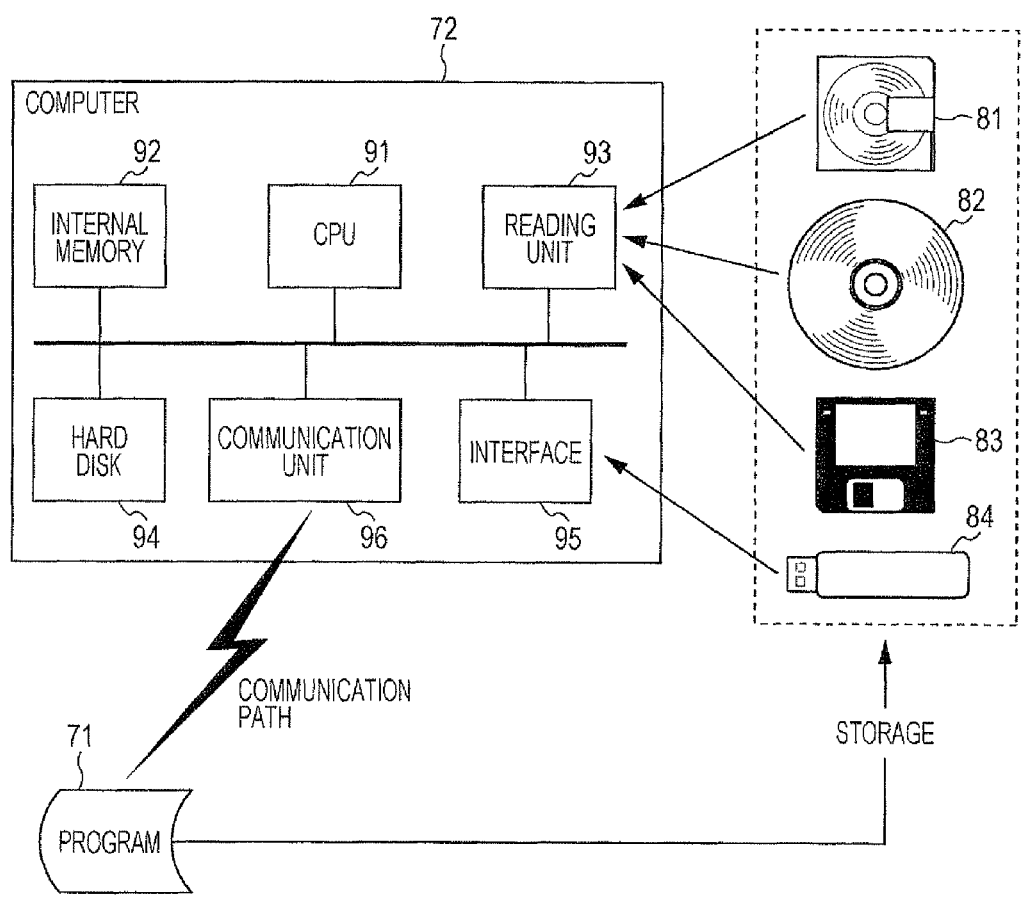
FIG. 14 illustrates an example of a computer program, a non-transitory storage medium storing the computer program, and a computer when functions described in the exemplary embodiments of the present invention are implemented by the computer program.

FIG. 14 illustrates an example of a computer program, a non-transitory storage medium storing the computer program, and a computer when the functions described in the foregoing exemplary embodiments of the present invention are implemented by the computer program.

All or some of the functions of the respective units described above in the exemplary embodiment of the present invention may be implemented by a program 71 executed by a computer 72. In this case, the program 71, data used in the program 71, and the like may be stored in a non-transitory storage medium read by the computer 72. The term "non-transitory storage medium", as used herein, means a medium in which changes in energy such as magnetic energy, optical energy, or electric energy are induced in accordance with the content of the program 71 and the content of the program 71 is transmitted to a reading unit 93 provided in a hardware resource of the computer 72 in the form of corresponding signals. Examples of the non-transitory storage medium include a magneto-optical disk 81, an optical disk 82 (including a compact disc (CD) and a digital versatile disc (DVD)), a magnetic disk 83, and a memory 84 (including an integrated circuit (IC) card, a memory card, and a flash memory). The above storage media may not necessarily be portable.

The program 71 is stored in the above storage media, and the storage media are placed in, for example, the reading unit 93 or an interface 95 of the computer 72 so that the program 71 is read on the computer 72. The read program 71 is stored in an internal memory 92 or a hard disk 94 (including a magnetic disk and a silicon disk), and a central processing unit (CPU) 91 executes the program 71, thereby implementing all or some of the functions described above in the exemplary embodiment of the present invention. Alternatively, the program 71 may be transferred to the computer 72 via a communication path. In the computer 72, the program 71 may be received at a communication unit 96 and may be stored in the internal memory 92 or the hard disk 94, and the CPU 91 may execute the program 71, thereby implementing all or some of the functions described above in the exemplary embodiment of the present invention.

The computer 72 may be connected to various devices via the interface 95. Some portions of the computer 72 may be configured by hardware or all the portions may be configured by hardware. Alternatively, the computer 72 may be configured by a program including all or some of the functions described in the exemplary embodiment of the present invention together with other configuration. When the computer 72 is used for other application, the program may be integrated with a program used for the application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
   a plurality of computation units having different center color signals set therein, each of the plurality of computation units being configured to calculate a weighted value in accordance with a distance between a given color signal and the set center color signal; and
   a combining unit that determines a composite output color signal in accordance with the weighted values calculated by the plurality of computation units.

2. The color processing apparatus according to claim 1, wherein each of the plurality of computation units converts the given color signal in accordance with a conversion coefficient to obtain an intermediate color signal in addition to the weighted value, and
   wherein the combining unit determines the composite output color signal by determining a weighted average of the intermediate color signals obtained from the plurality of computation units using the weighted values.

3. The color processing apparatus according to claim 2, wherein the conversion coefficients are calculated so that the composite output color signal obtained from the combining unit when a first color signal is given to each of the plurality of computation units becomes a second color signal, in accordance with a plurality of actual color signal pairs each of which is a pair of the first color signal and the second color signal, the second color signal being obtained by giving the first color signal to an output device and measuring a color output from the output device.

4. The color processing apparatus according to claim 3, wherein the center color signals and a shape of functions for determining the weighted values are set in accordance with the plurality of actual color signal pairs.

5. The color processing apparatus according to claim 3, further comprising an adjustment unit that adjusts the conversion coefficients using pairs of color signals including the center color signals and measured color signals obtained by giving the center color signals to the output device and measuring colors output from the output device.

6. The color processing apparatus according to claim 3, further comprising:
   a disabling unit that disables a computation unit among the plurality of computation units;
   an accuracy calculation unit that calculates conversion accuracy from an output color signal and a measured color signal, the output color signal being obtained by giving a color signal to a configuration in which a computation unit has been disabled, the measured color signal being obtained by giving the color signal to the output device and measuring a color output from the output device; and
   a disablement determination unit that determines whether or not disablement of a computation unit by the disabling unit is acceptable in accordance with the conversion accuracy calculated by the accuracy calculation unit.

7. The color processing apparatus according to claim 1, wherein the combining unit determines the composite output color signal using a conversion coefficient, the conversion coefficient being calculated so that a second color signal is calculated from a plurality of weighted values obtained when a first color signal is given to each of the plurality of computation units, in accordance with a plurality of actual color signal pairs each of which is a pair of the first color signal and the second color signal, the second color signal being obtained by giving the first color signal to an output device and measuring a color output from the output device.

8. The color processing apparatus according to claim 7, wherein the center color signals and a shape of functions for determining the weighted values are set in accordance with the plurality of actual color signal pairs.

9. The color processing apparatus according to claim 7, further comprising an adjustment unit that adjusts the conversion coefficient using pairs of color signals including the center color signals and measured color signals obtained by giving the center color signals to the output device and measuring colors output from the output device.

10. The color processing apparatus according to claim 7, further comprising:
    a disabling unit that disables a computation unit among the plurality of computation units;
    an accuracy calculation unit that calculates conversion accuracy from an output color signal and a measured color signal, the output color signal being obtained by giving a color signal to a configuration in which a computation unit has been disabled, the measured color signal being obtained by giving the color signal to the output device and measuring a color output from the output device; and
    a disablement determination unit that determines whether or not disablement of a computation unit by the disabling unit is acceptable in accordance with the conversion accuracy calculated by the accuracy calculation unit.

11. A color processing method comprising:
    calculating a weighted value in accordance with a distance between a given color signal and each of set different center color signals; and
    determining a composite output color signal in accordance with the calculated weighted values.

12. A non-transitory computer readable medium storing a program causing a computer to execute a process for performing color processing, the process comprising:
    calculating a weighted value in accordance with a distance between a given color signal and each of set different center color signals; and
    determining a composite output color signal in accordance with the calculated weighted values.

* * * * *